Figure 1:
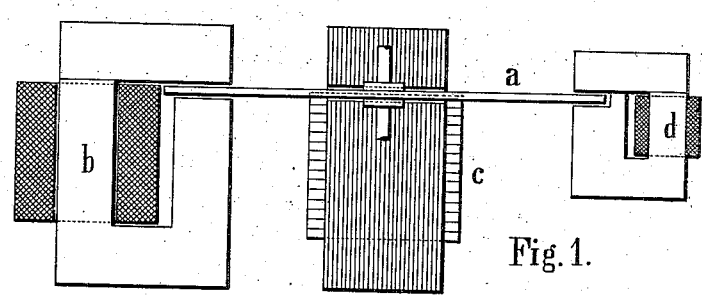

No. 819,242. PATENTED MAY 1, 1906.
E. MORCK.
ALTERNATING CURRENT METER ON FERRARIS PRINCIPLE.
APPLICATION FILED MAY 10, 1904.

Witnesses.
O. Knight Jr.

Inventor.
Emanuel Morck
by Knight Bros.
Attys.

UNITED STATES PATENT OFFICE.

EMANUEL MORCK, OF FRANKFORT-ON-THE-MAIN, GERMANY.

ALTERNATING-CURRENT METER ON FERRARIS PRINCIPLE.

No. 819,242.  Specification of Letters Patent.  Patented May 1, 1906.

Application filed May 10, 1904. Serial No. 207,315.

*To all whom it may concern:*

Be it known that I, EMANUEL MORCK, electrical engineer, a subject of the German Emperor, and a resident of 33 Ulmenstrasse, Frankfort-on-the-Main, German Empire, have invented a certain new and useful Improvement in Alternating-Current Meters on Ferraris Principle; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an alternating-current meter on Ferraris principle. The number of revolutions of the armature is:

$$n = \frac{\text{Ep.} \cdot J \cdot \cos \varphi}{c_1 + c_2 \text{Ep}^2 + c_3 J^2} \quad (1.)$$

in which Ep. J. cos. $\varphi$ represents the work done by the alternating current. $c_1$ is the damping by the permanent magnet. $c_2$ Ep.$^2$ is the damping by the potential coil. $c_3$ J$^2$ is the damping by the current-coil. This equation (1) is correct in cases where the friction is accurately compensated for, the frequency is constant, and the acting fields are proportional to Ep. and J. If now Ep. and cos. $\varphi$ be constant, then the equation (1) assumes the form $$n = \frac{J \cdot a}{a' + b' J^2} \quad (2.)$$

If J be varied, then $n$ should vary in the same proportion in order that the meter may register the exact consumption in watts; but this is not the case, because, as is shown by the equation (2), the numerator of the fraction increases linearly, as J, so that consequently the denominator ought to be constant; yet the denominator increases, and, in fact, increases as the square of J in the second member of the sum—that is to say, the ratio or proportional number between the number of revolutions of the armature and the consumption in watts diminishes as J increases. Attempts have been made to obviate this decrease by distorting the current-field or by causing an auxiliary coil dependent on the main current to act together with the main-current coil of the motor, so as to produce an additional torque or turning moment proportional to J$^2$. In such a case then $$n = \frac{J \cdot a + b'' J^2}{a' + b' J^2} = J \frac{a + b'' J}{a' + b' J^2} \quad (3.)$$

From this it is clear that such a numerator does not contain any real constant, because the factor of J in the equation (3) is not a constant number.

Now this invention has for its object to produce a real constant for the numerator by providing an additional torque or turning moment which shall increase as J$^3$ or as nearly as possible as J$^3$. The equation (3) then assumes the form $$n = \frac{a \cdot J + b J^3}{a' + b' J^2} = J \frac{a + b J^2}{a' + b' J^2} \quad (4.)$$

The factor of J in the equation (4) is constant for all current quantities or strengths where the proportions or circumstances are such that $\frac{a}{a'} = \frac{b}{b'}$, which can be done without difficulty.

A torque or turning moment which increases with J$^3$ may be provided, for instance, by causing the main-current coil, together with an auxiliary coil containing iron, dependent on the main current, to act upon the armature, said auxiliary coil having as far as possible a quadratic curve of magnetization.

Figure 2:
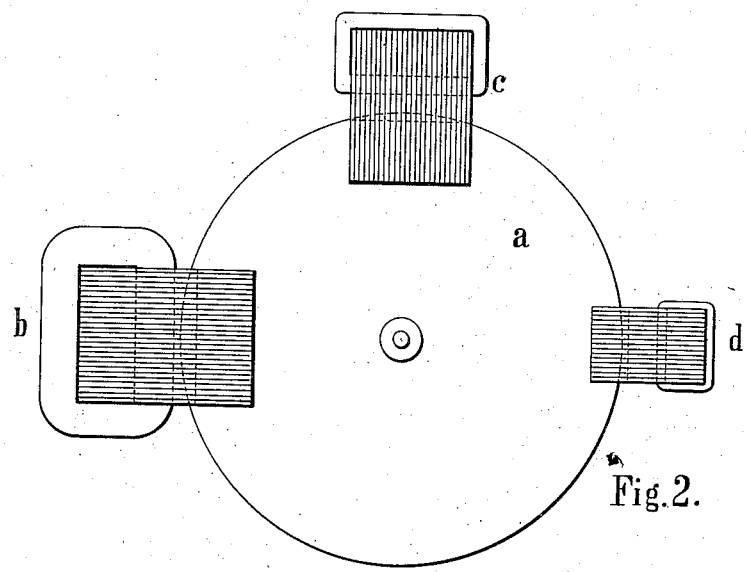
Figure 3:
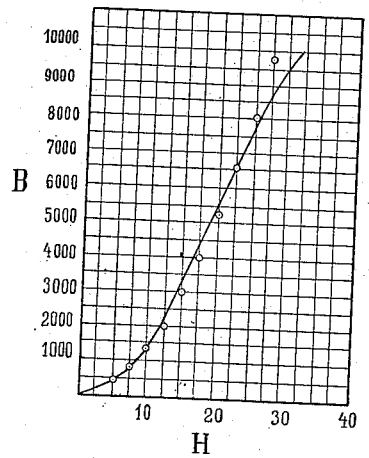

Figures 1 and 2 of the accompanying diagrammatic drawings show one construction of apparatus according to this invention in elevation and in plan. *a* is the armature; *b*, the potential coil; *c*, the main-current coil; *d*, the auxiliary coil containing iron. This latter coil should have as far as possible a quadratic curve of magnetization. Fig. 3 is a diagram showing a curve of magnetization of this kind for a determined sort of iron, while the inscribed points belong to a quadratic curve. As will be seen, there is almost complete coincidence or agreement up to B = 9,000.

The coil *d* acts together with the coil *c* upon the armature, and the only condition is that there should be a difference of phase between the fields of the two coils. The suitable conformation of the coil *d* and also the regulation of the amount of the additional torque or turning moment for a determined J may be effected in many ways.

For the following reasons the magnetism increases as the third power of the current. The main-current coil produces a field that is proportional to the current. The auxiliary coil produces a field that increases as the second power of the current. The main coil and the auxiliary coil impart to the armature a turning moment that is proportional to the product of their fields, and the said product increases as the third power of the current. Thus the two coils produce together a turning moment that increases as the third power of the current.

The reason for the increase of the effect of the auxiliary coil as the second power of the current is as follows: The total flux in the core of the auxiliary coil increases more than proportional to the current J within the range of the apparatus. The iron is thus little saturated over the entire range. The bridge, however, is slightly saturated when the current is small, and it is highly saturated when the current is high. Consequently when the flux is divided into a flux through the armature and a flux through the bridge, a relatively small flux passes through the armature and a great flux through the bridge when the current is weak. When the current is stronger, relatively less lines of force pass through the bridge and relatively many pass through the armature. The portions of the iron and air cross-sections of the paths of the iron and air lines of force are selected in such a manner that the field of the auxiliary coil passing through the armature increases as the second power of the current J. It will thus be seen that only the rapidly-increasing portion of the curve of magnetization is used for the auxiliary coil. The said portion of the curve is, as will be seen from Fig. 3, very much like the quadratic curve. In Fig. 3 is, for the sake of comparison, indicated a quadratic curve, for which follows the law $y = (3.6\ x)^2$. The curve in full line thus represents the curve of magnetization (as found by experiments) for a determined sort of iron by slight saturation—that is to say, the curve indicates the law governing the increase of B with H. The small circles relate to the curve $y = (3.6\ x)^2$.

It will easily be seen from Fig. 3 that up to $B = 9,000$ the experimentally-found curve of magnetization is very much like the quadratic curve $y = (3.6\ x)^2$. It thus follows that within the limits shown in Fig. 3 the induction B of the auxiliary coil increases, when the said sort of iron is used, as the second power, while H increases linearly.

As H is proportional to the current J, the field of the auxiliary coil consequently increases as the second power of J when J increases linearly, and the turning moment of both coils, therefore, increases as the third power of J, when J increases linearly.

Having thus described my invention, what I claim as new, and desire to secure by Letters Patent of the United States of America, is—

1. In an alternating-current meter on Ferraris principle, means providing an additional torque or turning moment on the armature which additional torque or turning moment increases exactly as or as far as is possible approximately as the third power of the effective current, for the purpose of eliminating the variable damping influence of the current-coil upon the indications of the meter, substantially as set forth.

2. In an alternating-current meter of Ferraris principle, the combination of the main-current coil with an auxiliary coil containing iron, dependent on the main current and having approximately a quadratic curve of magnetization as long as the iron remains unsaturated by the current in question, substantially as and for the purposes set forth.

3. In an alternating-current meter, the combination with the main-current coil, and the armature of an auxiliary coil having a bridge extending across the gap between the poles of the coils in which the armature revolves, said bridge and gap being so proportioned that the field passing through the armature of the auxiliary coil has a quadratic curve of magnetization.

The foregoing specification signed at Berlin this 26th day of April, 1904

EMANUEL MORCK.

In presence of—
WOLDEMAR HAUPT,
HENRY HASPER,
KARL FRANCKE.